(No Model.)

J. NOBLE.
PLUMBER'S FITTING.

No. 334,543. Patented Jan. 19, 1886.

Attest:
J. J. McCarthy
A. E. F. Hansmann.

James Noble,
Inventor:
By Foster & Freeman
attys.

UNITED STATES PATENT OFFICE.

JAMES NOBLE, OF NEW YORK, N. Y.

PLUMBER'S FITTING.

SPECIFICATION forming part of Letters Patent No. 334,543, dated January 19, 1886.

Application filed March 14, 1885. Serial No. 158,772. (No model.)

*To all whom it may concern:*

Be it known that I, JAMES NOBLE, a citizen of the United States, residing in the city of New York, in the county and State of New York, have invented a new and useful Improvement in Plumbers' Fittings, of which the following is a specification.

My invention relates to the fittings of sanitary and useful plumbing in which there are connections with waste and ventilation pipes and with fixtures (such as sinks, closets, &c.) and in which use is made of traps.

Heretofore traps have been made distinct from the other parts of plumbing and have been fitted thereto separately.

The object of my improvement is to provide in a single plumber's fitting a trap, waste branch, and ventilation-arm, and to thereby secure greater strength, durability, and facility of adjustment as well as dispense with unnecessary material, space, labor, and consequent expense. I attain these objects by a fitting illustrated in the accompanying drawings, in which—

Figure 1:
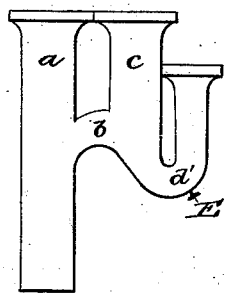
Figure 2:
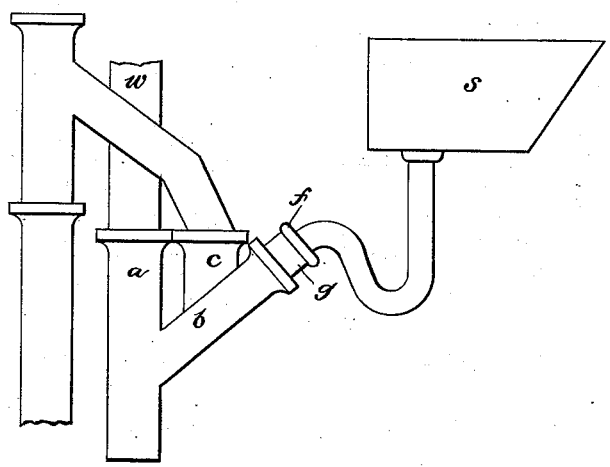
Figure 3:
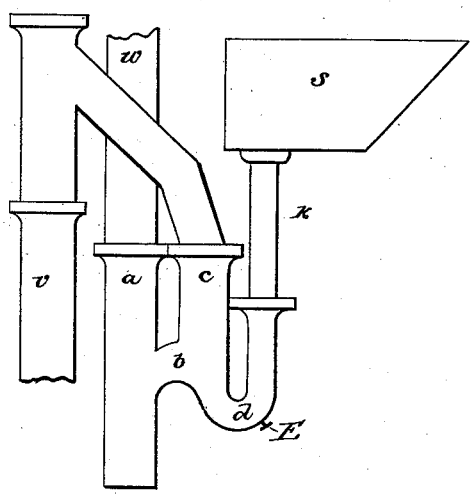
Figure 4:
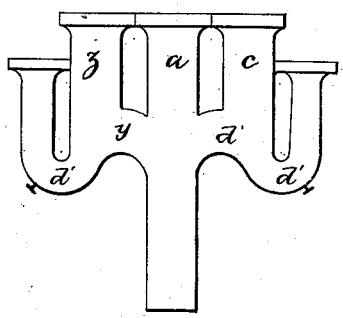

Figure 1 is a face view of my fitting with three arms. Fig. 2 is an elevation illustrating a form of fitting at present in use upon which the fitting now claimed is an improvement. Fig. 3 is a face view of my improved fitting with connections corresponding with those shown in Fig. 2, and Fig. 4 is a face view of my fitting with five arms to connect with fixtures on both sides.

The angles of the arms may be various, or the arms may be curved; but it is preferable to so arrange them that they will be united and the whole fitting compact.

Similar letters refer to similar parts throughout the several views.

In Fig. 2 the arm $a$ is a waste branch, and connects with the main waste-pipe $w$. The arm $c$ is a ventilation-arm and connects with the main ventilation-pipe $v$, and the arm $b$ connects with the trap $d$, which connects with the fixture $s$. Thus there are necessary the solder-joint $f$, and the brass or copper ferrule $g$; also, the trap $d$ is lead.

In Fig. 3 I have illustrated my improved fitting when used in connection with the same parts shown in Fig. 2 in connection with the other form of fitting, the said improved fitting consisting of a pipe, $a$, adapted for connection in the line of the vertical waste-pipe, a branch, $b$, extending from the side of the pipe $a$ and bent to form a trap, $d'$, and an intermediate branch extending upward from the highest part of the branch $b$, and adapted for connection with the iron branch of a branched iron fitting inserted in the line of the vent-pipe.

The connection of the fitting with both the waste-pipe and the vent-pipe, as illustrated in Fig. 3, may be made without the use of any lead pipes or solder. The connecting-piece $k$ may be of iron. The cleaning-hole in the trap $d'$ is at E, and this trap is preferably of smaller diameter than the other arms of the fitting as proper to be used with the connecting-piece $k$. By the use of my invention, therefore, the whole system of plumbing is much stronger as to both its parts and its joints, the solder-joint $f$ and the ferrule $g$ are dispensed with, the plumbing is much more compact, less material for casing is required, the plumbing may be set at one time when the building is unfinished and accessible, (there being less danger of injury to the pipes at all times by other work or otherwise than there is where lead pipes and solder-joints are used,) less labor is required, the lead trap $d$ is dispensed with, and the iron trap $d'$ is supplied in the place and at about the cost of the former arm, $b$, as shown in Fig. 2, and the system of pipes may for all of these reasons be laid at greatly reduced expense.

The fitting may be made in one piece of clay or other material, and two or more of the arms may be made with traps where the requirements of the case would make this proper.

It is apparent that my invention relates entirely to upright or perpendicular plumbing, (not to ground sewerage or horizontal plumbing,) and one of its incidental advantages is that it may be repeated on any number of floors of a building with the same ease and facility, and with no greater relative number of parts, connections, or joints than would be required in a single instance. This is true, because my fitting allows connections with the main pipes in both directions—up and down—with continuous passage to both the waste and ventilation pipes, and yet having water seals or traps for all fixtures. This connectibility in both directions I do not claim as my invention, for it is evident that even the simplest pipes might be so made, (as a number of straight pipes connected in a single straight line;) but it is of great advantage to have this connectibility in the combination of pipes with their various uses which are embraced within my invention. A double or multiplied fitting also may be laid as readily as one with only one set of connections, thereby saving the placing of two or more separate traps and all attendant joints and parts in each instance. This repeated on each floor would furnish connection with the main pipes for the plumbing of the whole building and at a great reduction of expense, &c. The spinal plumbing of the building, including all traps, can thus be set at one time, and when the building is open, (with little or no extra expense for any superfluous parts,) while connections or "taps" may be made for different fixtures, as required, without disturbance of either the building or the plumbing.

What I claim as my invention, and desire to secure by Letters Patent, is—

A plumber's fitting consisting of the pipe $a$, adapted for connection in the line of the vertical waste-pipe, a branch, $b$, extending from the side of the pipe and bent to form a trap, and an intermediate branch extending upward from the highest part of the branch $b$, and adapted for connection with the iron branch of the vent-pipe fitting, substantially as described.

JAMES NOBLE.

Witnesses:
NATHAN L. HAHN,
BENJ. OPPENHEIMER.